US 11,465,505 B2

(12) United States Patent
Suzuki et al.

(10) Patent No.: US 11,465,505 B2
(45) Date of Patent: Oct. 11, 2022

(54) FUEL CELL SYSTEM

(71) Applicant: NISSAN MOTOR CO., LTD., Yokohama (JP)

(72) Inventors: Kenta Suzuki, Kanagawa (JP); Mitsunori Kumada, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 447 days.

(21) Appl. No.: 16/061,433

(22) PCT Filed: Oct. 20, 2016

(86) PCT No.: PCT/JP2016/081132
§ 371 (c)(1),
(2) Date: Jun. 12, 2018

(87) PCT Pub. No.: WO2017/104256
PCT Pub. Date: Jun. 22, 2017

(65) Prior Publication Data
US 2020/0282848 A1    Sep. 10, 2020

(30) Foreign Application Priority Data

Dec. 15, 2015    (JP) .............................. JP2015-243837

(51) Int. Cl.
*B60L 1/00* (2006.01)
*B60L 50/75* (2019.01)
(Continued)

(52) U.S. Cl.
CPC ................. *B60L 1/00* (2013.01); *B60L 50/66* (2019.02); *B60L 50/71* (2019.02); *B60L 50/75* (2019.02);
(Continued)

(58) Field of Classification Search
CPC .......... B60L 50/75; B60L 53/22; B60L 50/66; B60L 50/71; H01M 8/04873; H01M 8/04947; H01M 2250/20
See application file for complete search history.

(56) References Cited

U.S. PATENT DOCUMENTS 6,777,909 B1 * 8/2004 Aberle .................... B60L 58/33
320/104
2006/0222909 A1    10/2006 Aoyagi et al.
(Continued)

FOREIGN PATENT DOCUMENTS

CN    109562698 B  *  2/2020  .............. B60L 50/75
JP    2007157477 A  *  6/2007
(Continued)

OTHER PUBLICATIONS

CN-109562698-B—Machine Translation.*
JP-4783580-B2_Machine_Translation (Year: 2011).*
JP-2007157477-A—Machine Translation (Year: 2007).*

*Primary Examiner* — Brian R Ohara
*Assistant Examiner* — Patrick Marshall Greene
(74) *Attorney, Agent, or Firm* — Foley & Lardner LLP (57) ABSTRACT

A fuel cell system in which a fuel cell is coupled to a motor driving battery and a vehicular auxiliary machine is coupled to the motor driving battery via a first voltage converter, the fuel cell system including a fuel cell auxiliary machine coupled to the first voltage converter; and a second voltage converter that couples the fuel cell auxiliary machine to the fuel cell.

5 Claims, 7 Drawing Sheets

(51) Int. Cl.
*B60L 53/22* (2019.01)
*B60L 50/71* (2019.01)
*H01M 8/04858* (2016.01)
*B60L 50/60* (2019.01)

(52) U.S. Cl.
CPC ......... *B60L 53/22* (2019.02); *H01M 8/04873* (2013.01); *H01M 8/04947* (2013.01); *H01M 2250/20* (2013.01)

(56) References Cited

U.S. PATENT DOCUMENTS

2015/0017485 A1    1/2015   Manabe et al.
2017/0271695 A1*   9/2017   Kemmer ........... H01M 8/04303

FOREIGN PATENT DOCUMENTS

| JP | 2009-140757 A | 6/2009 | |
| JP | 2011-036101 A | 2/2011 | |
| JP | 4783580 B2 * | 9/2011 | ........ H01M 8/04947 |
| JP | 2014-68490 A | 4/2014 | |
| WO | WO 2013/099009 A1 | 7/2013 | |

\* cited by examiner

FUEL CELL SYSTEM

TECHNICAL FIELD

The present invention relates to a fuel cell system.

BACKGROUND ART

JP2014-68490A discloses a configuration in which, in a configuration in which a fuel cell is coupled to a line that couples a motor driving battery to a drive motor, a low voltage battery is coupled to the line via a voltage converter so as to use this low voltage battery as an electric power supply for a vehicle control device. For an on-vehicle fuel cell, it is proposed to use a solid oxide fuel cell, which has conversion efficiency higher than that of a conventional solid polymer fuel cell.

SUMMARY OF INVENTION

While driving a solid oxide fuel cell requires an auxiliary machine, electric power cannot be generated in an activation control and a stop control of a fuel cell; therefore, it is required to provide electric power for the auxiliary machine from an outside. In this case, while a possible configuration is to couple this auxiliary machine to the aforementioned voltage converter, a load to the voltage converter increases.

It is an object of the present invention to provide a fuel cell system configured to perform a self-sustained operation of a fuel cell while reducing a load to a voltage converter electrically coupled to a motor driving battery.

A fuel cell system according to one embodiment of the present invention is a fuel cell system in which a fuel cell is coupled to a motor driving battery and a vehicular auxiliary machine is coupled to the motor driving battery via a first voltage converter, the fuel cell system including a fuel cell auxiliary machine coupled to the first voltage converter; and a second voltage converter that couples the fuel cell auxiliary machine to the fuel cell.

DESCRIPTION OF EMBODIMENTS

The following describes embodiments of the present invention with reference to drawings.

[Configuration of Fuel Cell System According to Embodiment]

Figure 1:
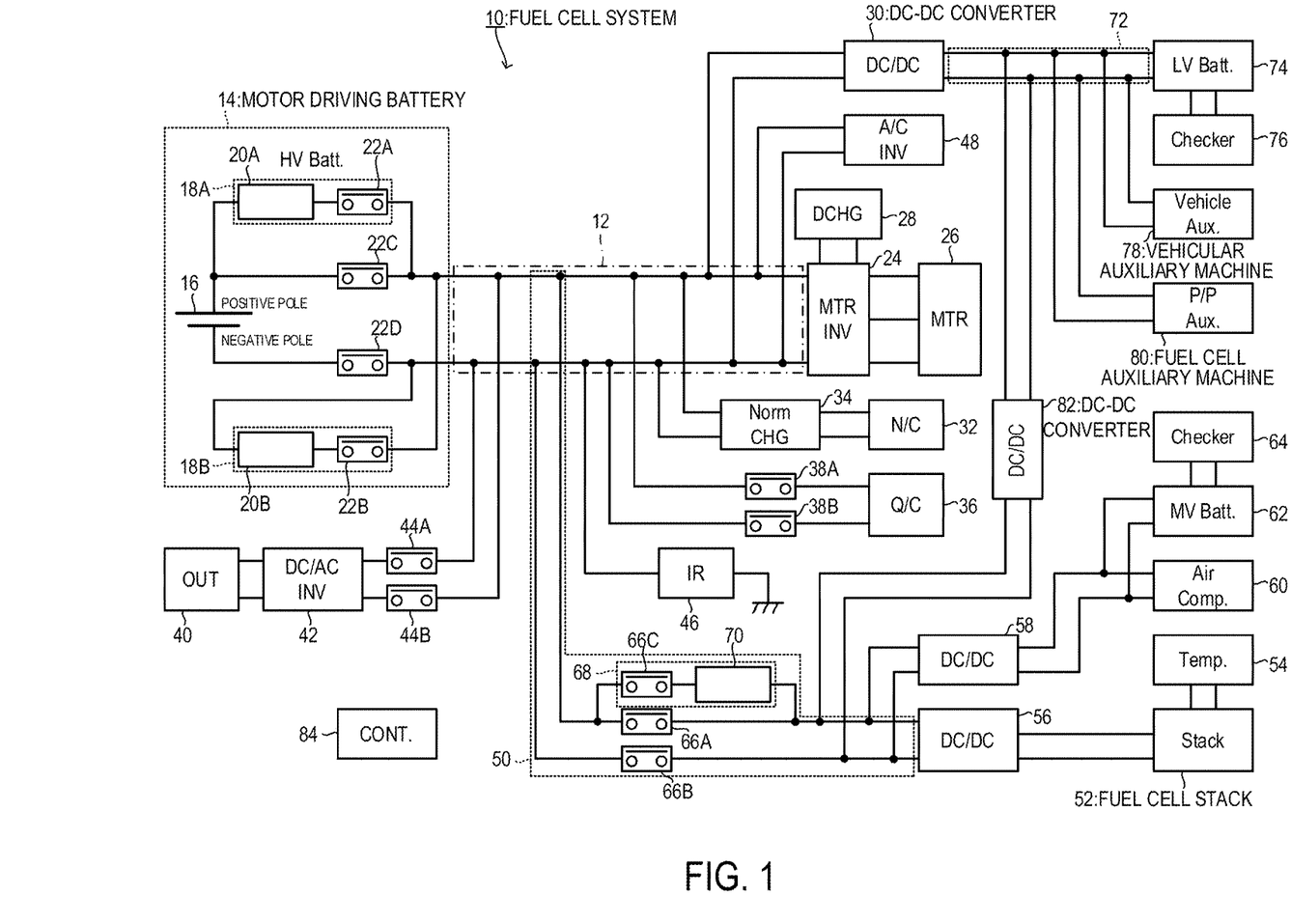
FIG. 1 is a block diagram illustrating a main configuration of a fuel cell system according to an embodiment.

FIG. 1 is a block diagram illustrating a main configuration of a fuel cell system 10 according to the embodiment. The fuel cell system 10 according to the embodiment is entirely controlled by a control unit 84. The fuel cell system 10 is configured such that, for example, a fuel cell stack 52 (a fuel cell) is coupled to an electric power supply line 12 (for example, 360V), which couples a motor driving battery 14 to a drive motor 26 (a motor driving inverter 24), via a coupling line 50. The fuel cell system 10 is configured such that, for example, a fuel cell auxiliary machine 80 is coupled to a low-voltage line 72 (for example, 12V), which couples a DC-DC converter 30 (a first voltage converter) coupled to the electric power supply line 12 to an auxiliary machine battery 74. Furthermore, the fuel cell system 10 is configured such that a DC-DC converter 82 (a second voltage converter) couples the coupling line 50 to the low-voltage line 72.

The motor driving battery 14, the motor driving inverter 24 (the drive motor 26), the DC-DC converter 30, a low speed charging terminal 32, a rapid charging terminal 36, an external coupling terminal 40, an IR sensor 46, and an air conditioner inverter 48 are coupled to the electric power supply line 12.

A DC-DC converter 56 (the fuel cell stack 52), a DC-DC converter 58 (a compressor 60 and a compressor battery 62), a switch 66A (a changeover switch), a switch 66B, a charging circuit 68 constituted of a series circuit of a resistive element 70 and a switch 66C, and the DC-DC converter 82 are coupled to the coupling line 50.

The DC-DC converter 30, the auxiliary machine battery 74, a vehicular auxiliary machine 78, the fuel cell auxiliary machine 80, and the DC-DC converter 82 are coupled to the low-voltage line 72.

The motor driving battery 14 includes a main power supply 16 (for example, 360V) coupled to the electric power supply line 12, a switch 22C coupled to a side of the positive pole of the main power supply 16, and a switch 22D coupled to a side of the negative pole of the main power supply 16. The switch 22C has one side coupled to the positive pole side of the main power supply 16 and the other side coupled to a side of the positive pole of the electric power supply line 12. The switch 22D has one side coupled to the negative pole side of the main power supply 16 and the other side coupled to a side of the negative pole of the electric power supply line 12. In the positive pole side of the main power supply 16, a charging circuit 18A as a series circuit of a resistive element 20A and a switch 22A is coupled in parallel to the switch 22C. Furthermore, a charging circuit 18B as a series circuit of a resistive element 20B and a switch 22B is coupled to a side of the electric power supply line 12 of the switch 22C and the electric power supply line 12 side of the switch 22D. The charging circuits 18A and 18B are temporarily used when the motor driving battery 14 is coupled to the electric power supply line 12 to charge an electric charge to, for example, a capacitor inside the motor driving inverter 24 and avoids a damage to, for example, the motor driving battery 14 and the motor driving inverter 24 by avoiding an inrush current at coupling.

The motor driving inverter 24 is coupled to the electric power supply line 12 (the positive pole side and the negative pole side), converts electric power (a DC voltage) supplied from the motor driving battery 14 or the fuel cell stack 52 into three-phase AC power, and supplies this to the drive motor 26 to rotate the drive motor 26. The motor driving inverter 24 converts regenerative electric power generated by the drive motor 26 at braking of a vehicle into electric power of DC voltage to supply the electric power of DC voltage to the motor driving battery 14.

When the fuel cell system 10 is stopped, the motor driving battery 14 is cut off from the electric power supply line 12. At this time, the capacitor included in the motor driving inverter 24 remains storing the electric charge; therefore, the electric power supply line 12 maintains a high voltage even after the cutoff. However, it is necessary to decrease the voltage of the electric power supply line 12 to equal to or less than a predetermined voltage (for example, 60V) in order to prevent an electric leakage. Therefore, the motor driving inverter 24 includes a discharge circuit 28 to discharge the electric charge stored in the capacitor in order to step down the voltage of the electric power supply line 12.

The DC-DC converter 30 (a first voltage conversion circuit) is coupled to the electric power supply line 12 and steps down the DC voltage of the electric power supply line 12 to supply the electric power of the low DC voltage to the low-voltage line 72.

The low speed charging terminal 32 is coupled to an external AC power supply of an AC voltage, such as a household power source, to charge the motor driving battery 14. The low speed charging terminal 32 is coupled to the electric power supply line 12 via a charger 34, which converts the AC voltage into a DC voltage applied to the electric power supply line 12. The low speed charging terminal 32 includes a limit switch (not illustrated) to output a detection signal to the control unit 84 as soon as the low speed charging terminal 32 is coupled to the external AC power supply.

The rapid charging terminal 36 is coupled to an external DC power supply in, for example, a service station built similarly to a gas station to supply a DC voltage to output this DC voltage to the electric power supply line 12 to rapidly charge the motor driving battery 14. The rapid charging terminal 36 is coupled to the electric power supply line 12 via switches 38A and 38B. The rapid charging terminal 36 also includes a limit switch (not illustrated) to output a detection signal to the control unit 84 as soon as the rapid charging terminal 36 is coupled to the external DC power supply.

The external coupling terminal 40 is coupled to an external device, such as household equipment, and drives the external device with the electric power from the motor driving battery 14 or the fuel cell stack 52. The external coupling terminal 40 is coupled to the electric power supply line 12 via an external coupling inverter 42 and switches 44A and 44B. It should be noted that the external coupling terminal 40 also includes a limit switch (not illustrated) such that the limit switch outputs a detection signal to the control unit 84 as soon as the external coupling terminal 40 is coupled to the external device.

The IR sensor 46 is coupled to the negative pole side of the electric power supply line 12 and a vehicular body (not illustrated), applies a constant voltage between both the sides, and measures a stray capacitance between both the sides. An insulation resistance of the electric power supply line 12 to the body is measured from this stray capacitance, and it can be determined whether an electric leakage of the electric power supply line 21 is present or absent from the magnitude of the insulation resistance.

Additionally, for example, the air conditioner inverter 48 for an air conditioner in the vehicle is coupled to the electric power supply line 12.

The fuel cell stack 52 is a solid oxide fuel cell (SOFC). The fuel cell stack 52 is provided by stacking cells obtained by an electrolyte layer made of a solid oxide, such as ceramic, being sandwiched between an anode (a fuel pole) to which a fuel gas reformed by a reformer is supplied and a cathode (an air pole) to which an air containing oxygen as an oxidizing gas is supplied. The fuel cell stack 52 is coupled to the coupling line 50 via the DC-DC converter 56. It should be noted that the fuel cell stack 52 includes a temperature sensor 54 that measures a temperature inside the fuel cell stack 52.

The DC-DC converter 56 has an input side coupled to the fuel cell stack 52 and an output side (a step up side) coupled to the coupling line 50. The DC-DC converter 56 steps up the output voltage (for example, 60V or a voltage equal to or less than it) of the fuel cell stack 52 to a voltage of the electric power supply line 12 and supplies the voltage to the coupling line 50. This supplies the electric power from the fuel cell stack 52 to the motor driving battery 14 or the drive motor 26 (the motor driving inverter 24) via the coupling line 50 and the electric power supply line 12.

The DC-DC converter 58 has an input side coupled to the coupling line 50 and an output side (for example, 42V) coupled to the compressor 60. The compressor 60 and the compressor battery 62 are coupled in parallel to a step down side of the DC-DC converter 58. The compressor 60 supplies, for example, the oxidizing gas (an air) to the fuel cell stack 52. It should be noted that a charge checker 64, which measures the amount of charge, is coupled to the compressor battery 62.

The switch 66A (the changeover switch) is disposed in a side of the positive pole of the coupling line 50. The switch 66A has one side coupled to the positive pole side of the electric power supply line 12 and the other side coupled to, for example, the DC-DC converter 56. Similarly, the switch 66B is disposed in a side of the negative pole of the coupling line 50. The switch 66B has one side coupled to the negative pole side of the electric power supply line 12 and the other side coupled to, for example, the DC-DC converter 56. The switch 66A and the switch 66B switch a cutoff (OFF) and a coupling (ON) of the coupling line 50. In the positive pole side of the coupling line 50, the charging circuit 68 as a series circuit of the resistive element 70 and the switch 66C is coupled in parallel to the switch 66A. The charging circuit 68 is temporarily used when the motor driving battery 14 is coupled to, for example, the DC-DC converter 56 to charge an electric charge to the capacitor that belongs to, for example, the DC-DC converter 56 and avoids a damage to, for example, the motor driving battery 14 and the DC-DC converter 56 by avoiding an inrush current at coupling.

The auxiliary machine battery 74 is a battery having an output voltage lower than that of the motor driving battery 14. The auxiliary machine battery 74 is charged by an electric power supply from the DC-DC converter 30 (the first voltage converter) and the DC-DC converter 82 (the second voltage converter) and supplies the electric power to the vehicular auxiliary machine 78 and the fuel cell auxiliary machine 80. A charge checker 76, which measures the amount of charge, is coupled to the auxiliary machine battery 74.

The vehicular auxiliary machine 78 is, for example, a vehicular illumination and a car navigation system and is equipment operated with electric power with a lower voltage range and a lower-current (low electric power) than that of the drive motor 26.

The fuel cell auxiliary machine 80 includes, for example, a fuel supply unit (a pump and an injector) that supplies the fuel to the fuel cell stack 52. The fuel cell auxiliary machine 80 includes, for example, a valve (not illustrated) that opens and closes a passage through which the fuel gas and the oxidizing gas are distributed, a diffusion combustor (not illustrated) that generates a combustion gas for heating supplied to the fuel cell stack 52 during the activation control, and a circuit (not illustrated) that applies a reverse bias for an anode pole protection to the fuel cell stack 52 during the stop control. The fuel cell auxiliary machine 80 is equipment operated with the low electric power as is the case with the above description.

In the activation control of the fuel cell stack 52, a combustion gas, which is made by mixing and combusting a fuel for activation and an air, is generated using, for example, the diffusion combustor. This is supplied to the fuel cell stack 52 instead of the oxidizing gas and the fuel cell stack 52 is heated up to a temperature required for an electric generation.

In the stop control of the fuel cell stack 52, the oxidizing gas is continuously supplied as a cooling gas to decrease the temperature down to a temperature at which an oxidation of an anode is avoidable, and then the fuel cell auxiliary machine 80 and the compressor 60 are stopped. At that time, a control to close a valve in a passage of an anode off-gas after use to prevent the oxygen from flowing backward and a control to apply an electromotive force that opposes a polarity of the fuel cell stack 52 to the fuel cell stack 52 are performed in order to prevent the oxidation of the anode. Another stop control includes a method in which the flow rate of the fuel gas is decreased but the amount of power generation with which the compressor 60 and the fuel cell auxiliary machine 80 are barely drivable is maintained, and the temperature of the fuel cell stack 52 is decreased. Accordingly, the compressor 60 and the fuel cell auxiliary machine 80 are used not only in the activation control but also in the stop control of the fuel cell stack 52; therefore, the electric power for them is required.

The DC-DC converter 82 (the second voltage conversion circuit) has an input side coupled to the coupling line 50 and an output side (the step down side) coupled to the low-voltage line 72. The DC-DC converter 82 steps down the voltage of the coupling line 50 to supply the electric power to the low-voltage line 72. The DC-DC converter 82 is coupled to a side of the fuel cell stack 52 with respect to the switches 66A and 66B and the charging circuit 68 in the coupling line 50. This ensures the DC-DC converter 82 supplying the electric power from the fuel cell stack 52 to the low-voltage line 72 even though the switches 66A and 66B cut off the coupling line 50. It should be noted that, although the illustration is omitted, sides of the coupling line 50 of the DC-DC converter 56, the DC-DC converter 58, and the DC-DC converter 82 also include discharge circuits (not illustrated).

The control unit 84 is constituted of general-purpose electronic circuits and peripheral devices including a microcomputer, a microprocessor, and a CPU and executes specific programs to execute processes in order to control the fuel cell system 10. At that time, the control unit 84 can perform ON/OFF controls that drive/stop the above-described respective components.

[Activation Control Procedure of Fuel Cell System]

Figure 2:
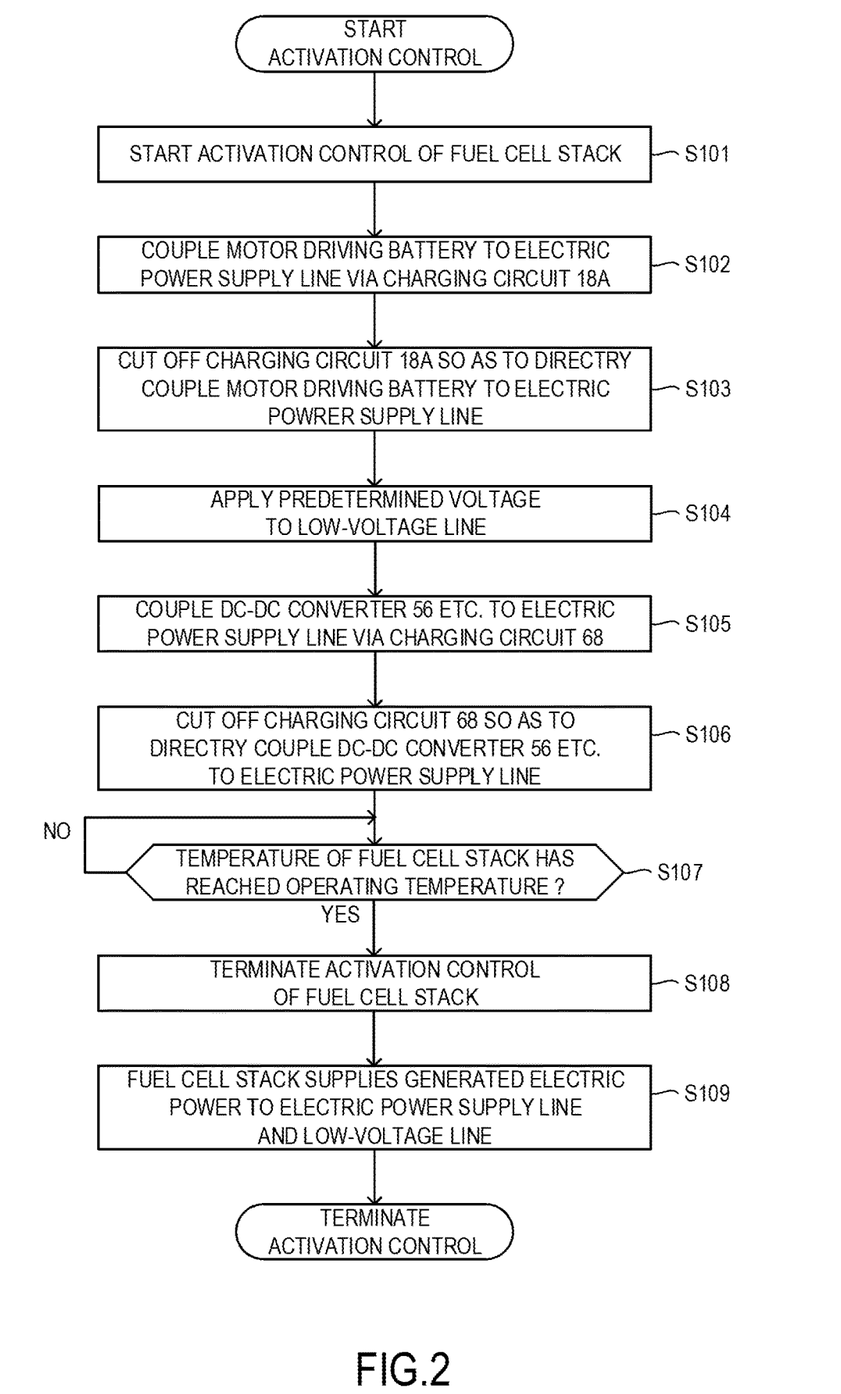
FIG. 2 is a flowchart illustrating a procedure of an activation control of the fuel cell system according to the embodiment.

An activation control procedure of the fuel cell system 10 according to the embodiment will be described in accordance with a flowchart in FIG. 2. In an initial state, all the switches 22A to 22D, 38A, 38B, 44A, 44B, and 66A to 66C are OFF, and the electric power supply line 12 and the coupling line 50 are stepped down to equal to or less than a predetermined voltage (for example, 60V). It is also assumed that the motor driving battery 14, the auxiliary machine battery 74, and the compressor battery 62 have reached respective predetermined amounts of charge.

As soon as the system starts the activation control, the control unit 84 turns the fuel cell auxiliary machine 80 and the compressor 60 ON to start the activation control for the fuel cell stack 52 at Step S101. At that time, the fuel cell auxiliary machine 80 is driven by the electric power from the auxiliary machine battery 74, and the compressor 60 is driven by the electric power from the compressor battery 62. This causes the activation control of the fuel cell stack 52 to be performed for the fuel cell stack 52 until reaching a temperature required for an electric generation.

At Step S102, the control unit 84 turns the switch 22A and the switch 22D ON to couple the motor driving battery 14 to the electric power supply line 12 via the charging circuits 18A and 18B, and applies a predetermined voltage (for example, 360V) to the electric power supply line 12, the motor driving inverter 24, the DC-DC converter 30, and the air conditioner inverter 48. At this time, the control unit 84 also turns the switch 22B ON to apply the voltage to the charging circuit 18B coupled in parallel to the electric power supply line 12. After a predetermined time at Step S102, the control unit 84 turns the switch 22C ON and then turns the switch 22A OFF to cut off the charging circuit 18A so as to directly couple the motor driving battery 14 to the electric power supply line 12 at Step S103. At this time, the control unit 84 also turns the switch 22B OFF to cut off the charging circuit 18B. This ensures a rotation of the drive motor 26 at any rotation speed on the basis of an accelerator operation of a driver.

At Step S104, the control unit 84 turns the DC-DC converter 30 ON to apply a predetermined voltage (for example, 12V) to the low-voltage line 72. This ensures the vehicular auxiliary machine 78 and the fuel cell auxiliary machine 80 receiving the electric power supply from the auxiliary machine battery 74 and the DC-DC converter 30 to be driven. At this time, the auxiliary machine battery 74 is charged with the DC-DC converter 30. At this time, the control unit 84 turns the air conditioner inverter 48 ON to cause the air conditioner for a vehicle interior to be in a usable state.

At Step S105, the control unit 84 turns the switch 66B and the switch 66C ON to apply a predetermined voltage to the coupling line 50 (for example, the DC-DC converter 56) via the charging circuit 68. Then, after a predetermined time at Step S105, the control unit 84 turns the switch 66A ON and then turns the switch 66C OFF to cut off the charging circuit 68 so as to directly couple the electric power supply line 12 to the coupling line 50 (for example, the DC-DC converter 56) at Step S106.

At Step S107, the control unit 84 determines whether the fuel cell stack 52 has reached an operating temperature required for the electric generation or not from a temperature measured by the temperature sensor 54. After the fuel cell stack 52 reaches the operating temperature, the control unit 84 terminates the activation control for the fuel cell stack 52 and supplies the fuel gas (the reformed gas) and the oxidizing gas to the fuel cell stack 52 to generate the electric power by electrochemical reaction at Step S108.

At Step S109, the control unit 84 turns the DC-DC converter 56, the DC-DC converter 58, and the DC-DC converter 82 ON. This causes the fuel cell stack 52 to supply the generated electric power to the electric power supply line 12 via the DC-DC converter 56 and to the low-voltage line 72 via the DC-DC converter 56 and the DC-DC converter 82. The fuel cell stack 52 supplies the generated electric power to the compressor 60 and the compressor battery 62 via the DC-DC converter 56 and the DC-DC converter 58. The activation control of the fuel cell system 10 is thus terminated.

[Operation of Fuel Cell System in Usual Electric Generation]

The drive motor 26 receives the electric power supply from the motor driving battery 14 and the fuel cell stack 52 and rotates at any rotation speed by the accelerator operation of the driver. The drive motor 26 generates the regenerative electric power at braking and this is charged to the motor driving battery 14 via the motor driving inverter 24. The motor driving battery 14 is charged by the electric power supply from the fuel cell stack 52 as soon as the amount of charge is equal to or less than a certain amount of charge. The auxiliary machine battery 74 is charged by the electric power supply from the DC-DC converter 30 and the DC-DC converter 82 and supplies the electric power to the vehicular auxiliary machine 78 and the fuel cell auxiliary machine 80. Furthermore, the vehicular auxiliary machine 78 and the fuel cell auxiliary machine 80 can be driven by the electric power supply from the DC-DC converter 30, the DC-DC converter 82, and the auxiliary machine battery 74. The compressor 60 receives the electric power supply from the compressor battery 62 and the DC-DC converter 58 to be driven, and the compressor battery 62 is charged by receiving the electric power supply from the DC-DC converter 58. Thus, in the usual electric generation, the control unit 84 cooperatively controls the DC-DC converter 30 and the DC-DC converter 82. This supplies the electric power to the aforementioned fuel supply unit (the pump and the injector) from the fuel cell stack 52 in a condition where the electric power is supplied from the motor driving battery 14 and the fuel cell stack 52 is operating; therefore, the supply of the fuel to the fuel cell stack 52 can be maintained while reducing a load of the DC-DC converter 30.

[Stop Control Procedure of Fuel Cell System]

Figure 3:
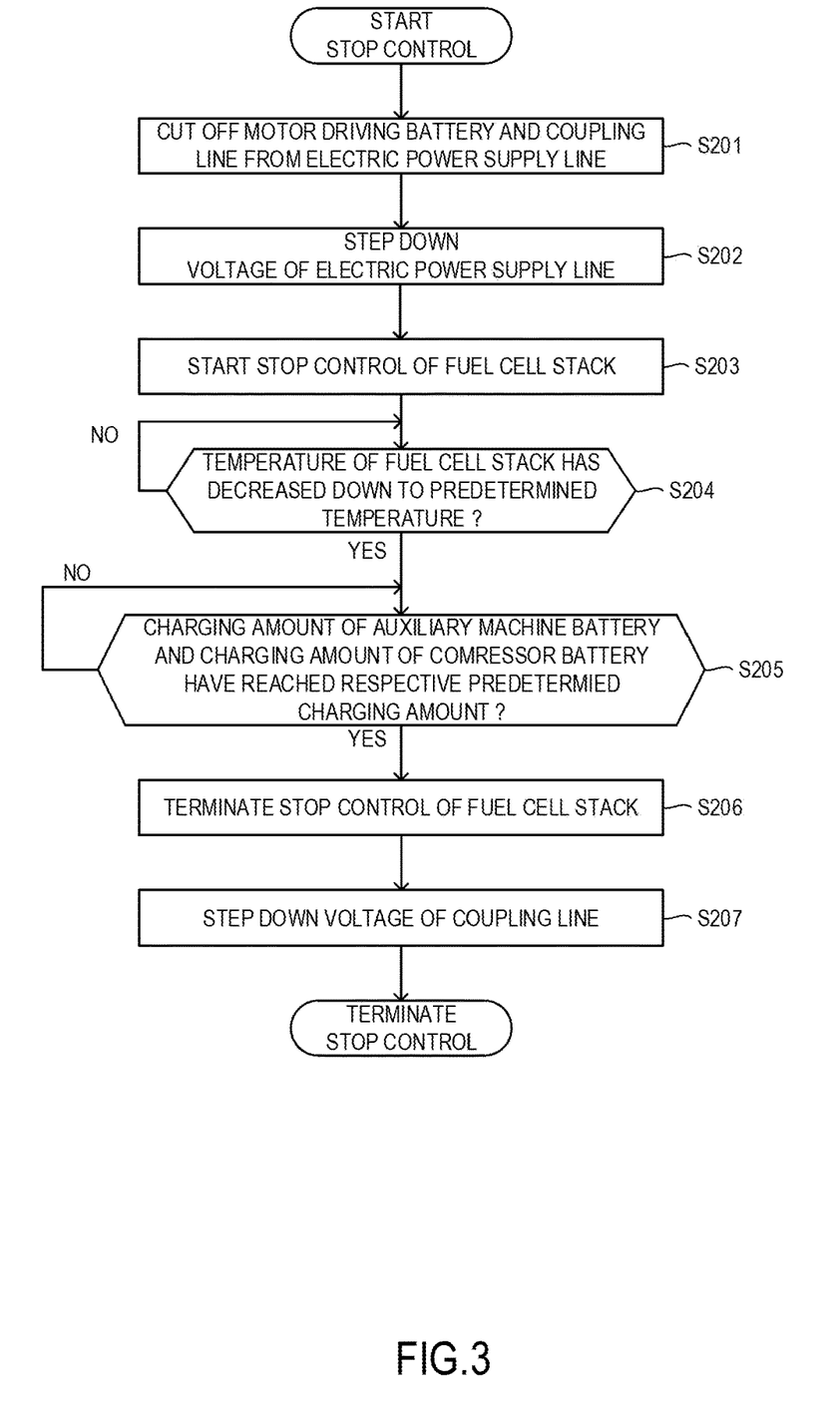
FIG. 3 is a flowchart illustrating a procedure of a stop control of the fuel cell system according to the embodiment.

A stop control procedure of the fuel cell system 10 according to the embodiment will be described in accordance with a flowchart illustrated in FIG. 3. At Step S201, the control unit 84 turns the switch 22C and the switch 22D OFF to cut off the motor driving battery 14 from the electric power supply line 12 and turns the switch 66A and the switch 66B OFF to cut off the coupling line 50 from the electric power supply line 12. This stops the electric power supply to the motor driving inverter 24 and the DC-DC converter 30. Simultaneously with this, the motor driving inverter 24, the DC-DC converter 30, and the air conditioner inverter 48 are turned OFF. At this time, while the electric power supply from the DC-DC converter 30 is stopped in the low-voltage line 72, the electric power supply from the fuel cell stack 52 is maintained via the DC-DC converter 82.

At Step S202, the control unit 84 turns the discharge circuit 28 ON to step down the voltage of the electric power supply line 12 to equal to or less than a predetermined voltage (for example, 60V), and then turns the discharge circuit 28 OFF. At that time, since the switch 66A and the switch 66B are already turned OFF, the electric charge held by the DC-DC converter 56, the DC-DC converter 58, and the DC-DC converter 82 does not flow into the discharge circuit 28.

At Step S203, the control unit 84 performs the stop control for the fuel cell stack 52. The stop control includes a case where the fuel gas supply is stopped to stop the electric generation of the fuel cell stack 52 so as to cool the fuel cell stack 52 as described above and a case where the fuel cell stack 52 is cooled while the fuel gas supply is minimized to generate the electric power barely enough for the fuel cell stack 52 to drive the compressor 60 and the fuel cell auxiliary machine 80, and further, barely enough to ensure charging the auxiliary machine battery 74. When the fuel cell stack 52 continues to generate the electric power, the electric power generated by the fuel cell stack 52 is continuously supplied to the compressor 60 via the DC-DC converter 58 and supplied to the fuel cell auxiliary machine 80 via the DC-DC converter 82 to be further supplied to the auxiliary machine battery 74 as well.

At Step S204, the control unit 84 determines whether a temperature of the fuel cell stack 52 has decreased down to the predetermined temperature at which the anode is not oxidized or not from the temperature measured by the temperature sensor 54. At Step S205, the control unit 84 determines whether the amount of charge of the auxiliary machine battery 74 measured by the charge checker 76 and the amount of charge of the compressor battery 62 measured by the charge checker 64 have reached respective predetermined amounts or not.

At Step S206, the control unit 84 turns the fuel cell auxiliary machine 80 and the compressor 60 OFF on condition that the fuel cell stack 52 has decreased down to the predetermined temperature and the auxiliary machine battery 74 and the compressor battery 62 have reached the predetermined amounts of charge, and terminates the stop control of the fuel cell stack 52.

At Step S207, the control unit 84 turns the DC-DC converter 56, the DC-DC converter 58, and the DC-DC converter 82 OFF and turns their discharge circuits (not illustrated) ON to step down the coupling line 50 to equal to or less than a predetermined voltage (for example, 60V), and then turns the discharge circuits OFF. The stop control of the fuel cell system 10 is thus terminated. It should be noted that Step S202 and Step S203 may be in reverse order or may be performed simultaneously.

[Low Speed Charge Control Procedure of Fuel Cell System]

Figure 4:
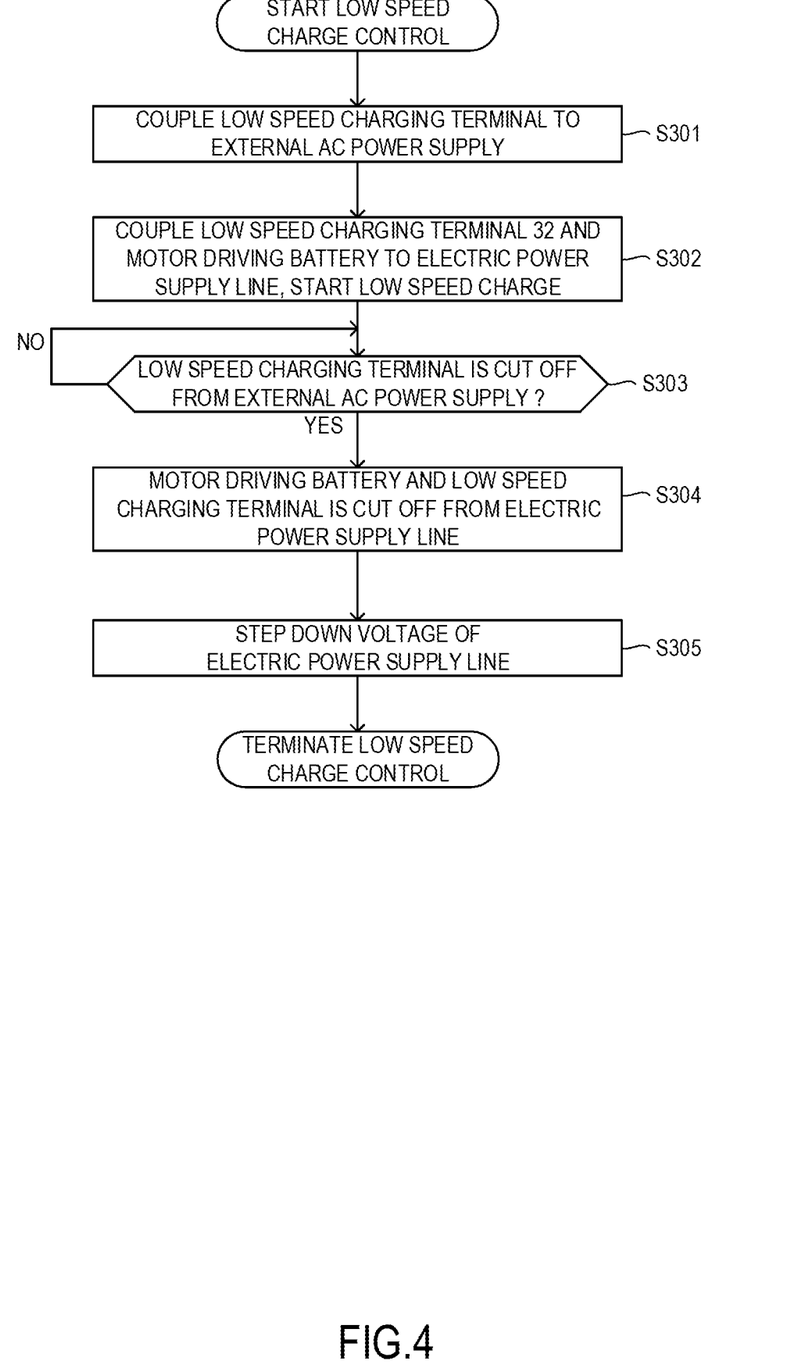
FIG. 4 is a flowchart illustrating a procedure of a low speed charge control of the fuel cell system according to the embodiment.

A low speed charge control procedure of the fuel cell system 10 according to the embodiment will be described in accordance with a flowchart illustrated in FIG. 4. An initial state is similar to the initial state in the aforementioned activation control. At Step S301, as soon as the low speed charging terminal 32 is coupled to the external AC power supply, the limit switch (not illustrated) outputs the detection signal to the control unit 84. At Step S302, the control unit 84 turns the charger 34, the switch 22C, and the switch 22D ON as soon as the detection signal is input. This steps up the electric power supply line 12 to a predetermined voltage (for example, 360V) and the motor driving battery 14 is charged by the electric power supply of the external AC power supply. At this time, the control unit 84 may turn the DC-DC converter 30 ON to charge the auxiliary machine battery 74.

At Step S303, when the detection signal is stopped, that is, the low speed charging terminal 32 is cut off from the external AC power supply, the control unit 84 turns the charger 34, the switch 22C, and the switch 22D OFF at Step S304. At Step S305, the control unit 84 turns the discharge circuit 28 ON to decrease the electric power supply line 12 down to equal to or less than a predetermined voltage (for example, 60V) and then, turns the discharge circuit 28 OFF.

[Rapid Charge Control Procedure of Fuel Cell System]

Figure 5:
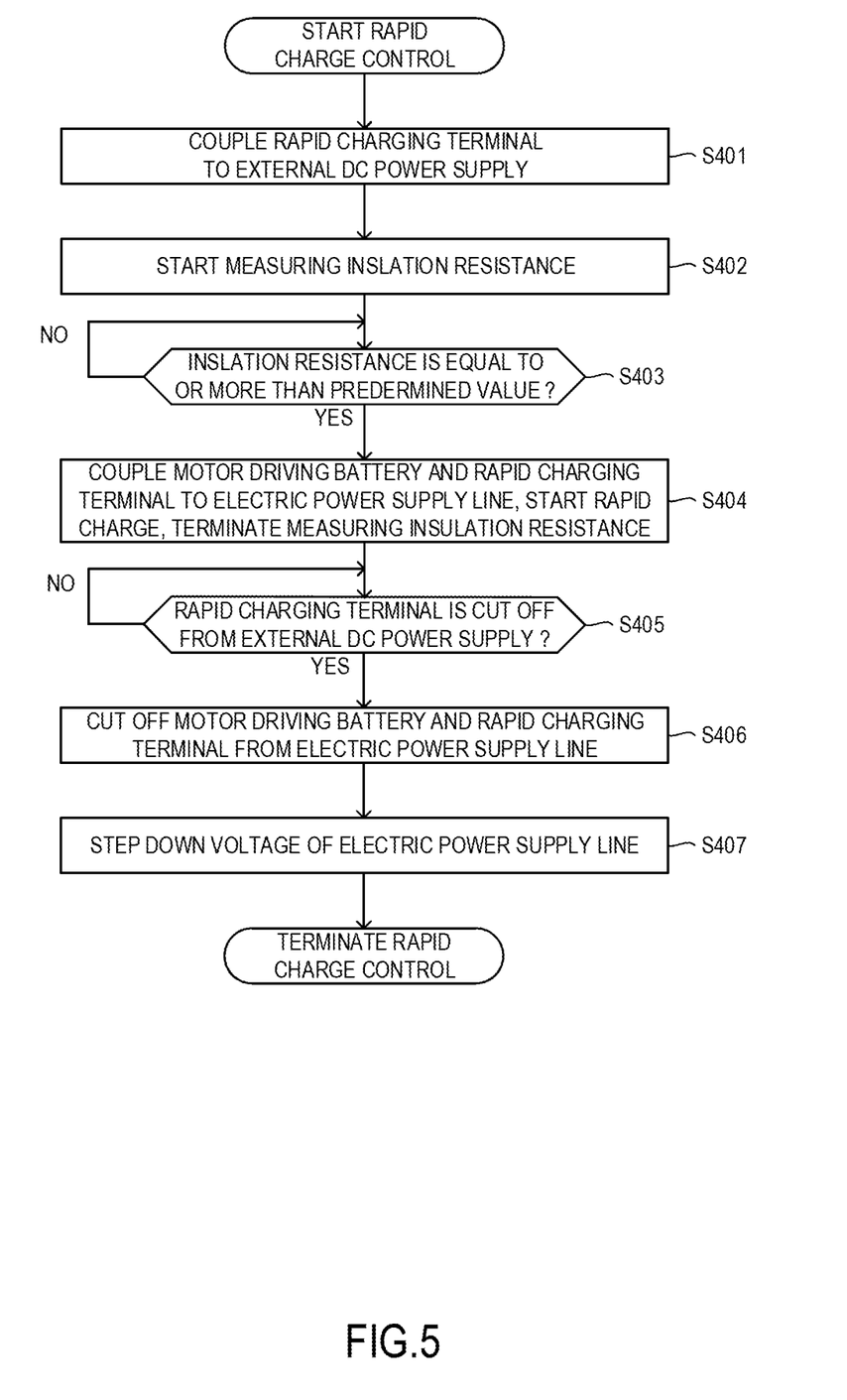
FIG. 5 is a flowchart illustrating a procedure of a rapid charge control of the fuel cell system according to the embodiment.

A rapid charge control procedure of the fuel cell system 10 according to the embodiment will be described in accordance with a flowchart illustrated in FIG. 5. An initial state is similar to the initial state at the aforementioned activation control. At Step S401, as soon as the rapid charging terminal 36 is coupled to the external DC power supply, the limit switch (not illustrated) outputs the detection signal to the control unit 84. At Step S402, the control unit 84 turns the IR sensor 46 ON to start measuring a value of an insulation resistance between the electric power supply line 12 and the body (not illustrated) as soon as the detection signal is input.

At Step S403, the control unit 84 determines whether the aforementioned insulation resistance is equal to or more than a predetermined value or not. At Step S404, the control unit 84 turns the switches 38A and 38B and the switches 22C and 22D ON when the aforementioned insulation resistance is equal to or more than the predetermined value. This couples the rapid charging terminal 36 to the electric power supply line 12 to step up the electric power supply line 12 to a predetermined voltage (for example, 360V) and the motor driving battery 14 (and, for example, the motor driving inverter 24) is rapidly charged with the external DC power supply. At this time, the control unit 84 may turn the DC-DC converter 30 ON to charge the auxiliary machine battery 74. The control unit 84 turns the IR sensor 46 OFF to terminate the measurement of the value of the aforementioned insulation resistance.

At Step S405, when the detection signal is stopped, that is, the rapid charging terminal 36 is cut off from the external DC power supply, the control unit 84 turns the switches 22C and 22D and the switches 38A and 38B OFF to cut off the motor driving battery 14 and the rapid charging terminal 36 from the electric power supply line 12 at Step S406. At Step S407, the control unit 84 turns the discharge circuit 28 ON to decrease the electric power supply line 12 down to equal to or less than a predetermined voltage (for example, 60V) and then, turns the discharge circuit 28 OFF.

[External Device Coupling Control Procedure of Fuel Cell System in Usual Electric Generation]

Figure 6:
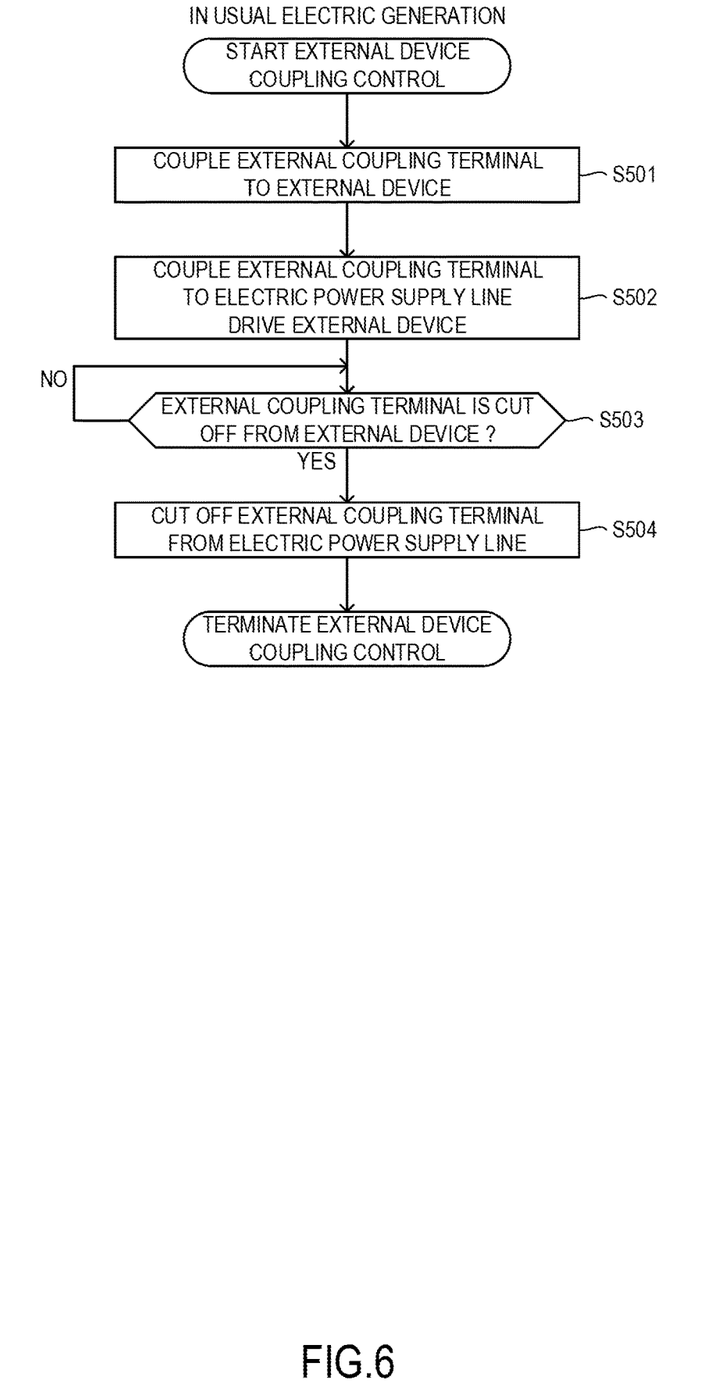
FIG. 6 is a flowchart illustrating a procedure of an external device coupling control in a usual electric generation of the fuel cell system according to the embodiment.

An external device coupling control procedure of the fuel cell system 10 according to the embodiment in the usual electric generation will be described in accordance with a flowchart illustrated in FIG. 6. At Step S501, as soon as the external coupling terminal 40 is coupled to an external device, the limit switch (not illustrated) outputs a detection signal to the control unit 84. At Step S502, the control unit 84 turns the external coupling inverter 42 and the switches 44A and 44B ON to couple the external coupling terminal 40 to the electric power supply line 12. This ensures driving the external device with the electric power from the motor driving battery 14 or the fuel cell stack 52.

At Step S503, when the detection signal is stopped, that is, the external coupling terminal 40 is cut off from the external device, the control unit 84 turns the external coupling inverter 42 and the switches 44A and 44B OFF to cut off the external coupling terminal 40 from the electric power supply line 12 at Step S504. It should be noted that the above-described procedure is possible in the low speed charging and the rapid charging. In the low speed charging, the external device can be driven with the electric power from the motor driving battery 14 or the external AC power supply. In the rapid charging, the external device can be driven with the electric power from the motor driving battery 14 or the external DC power supply.

[External Device Coupling Control Operation of Fuel Cell System in Vehicle Stop]

Figure 7:
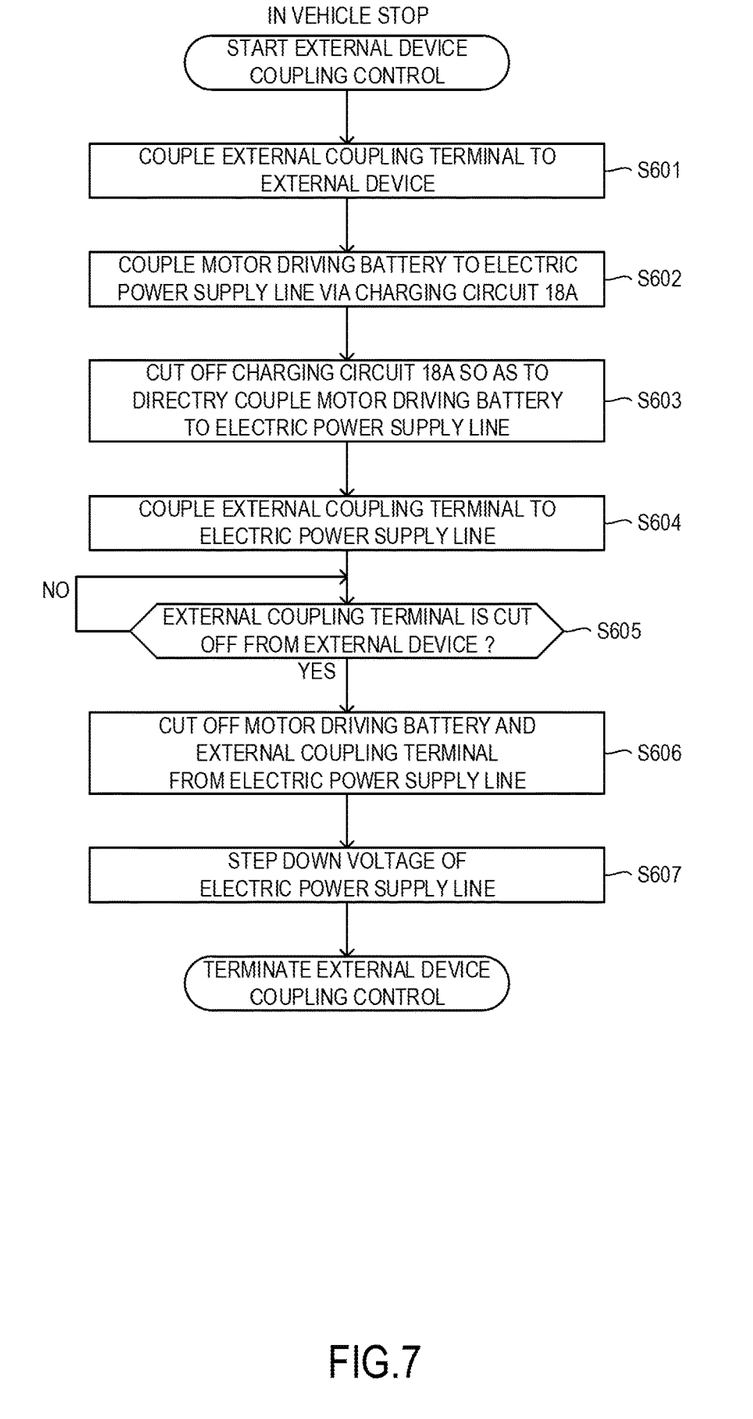
FIG. 7 is a flowchart illustrating a procedure of the external device coupling control in a vehicle stop of the fuel cell system according to the embodiment.

An external device coupling control procedure of the fuel cell system 10 according to the embodiment in a vehicle stop will be described in accordance with a flowchart illustrated in FIG. 7. At Step S601, as soon as the external coupling terminal 40 is coupled to an external device, the limit switch (not illustrated) outputs a detection signal to the control unit 84. At Step S602, the control unit 84 turns the switch 22A and the switch 22D ON to couple the motor driving battery 14 to the electric power supply line 12 via the charging circuit 18A and applies a predetermined voltage (for example, 360V) to the electric power supply line 12 (and, for example, the motor driving inverter 24). At this time, the control unit 84 also turns the switch 22B ON to electrically conduct the charging circuit 18B. After a predetermined time at Step S602, the control unit 84 turns the switch 22C ON and then turns the switch 22A OFF to cut off the charging circuit 18A so as to directly couples the motor driving battery 14 to the electric power supply line 12 as Step S603. At this time, the control unit 84 also turns the switch 22B OFF to cut off the charging circuit 18B.

At Step S604, the control unit 84 turns the external coupling inverter 42 and the switches 44A and 44B ON to couple the external coupling terminal 40 to the electric power supply line 12. This ensures driving the external device with the electric power from the motor driving battery 14. At Step S605, when the detection signal is stopped, that is, the external coupling terminal 40 is cut off from the external device, the control unit 84 turns the external coupling inverter 42, the switches 44A and 44B, and the switches 22C and 22D OFF to cut off the motor driving battery 14 and the external coupling terminal 40 from the electric power supply line 12 at Step S606. At Step S607, the control unit 84 turns the discharge circuit 28 ON to step down the electric power supply line 12 to equal to or less than a predetermined voltage (for example, 60V) and then turns the discharge circuit 28 OFF.

[Effect of Fuel Cell System According to Embodiment]

With the fuel cell system 10 according to the embodiment, the fuel cell auxiliary machine 80 is coupled to the DC-DC converter 30 (the first voltage converter) supplying the electric power to the vehicular auxiliary machine 78 and the DC-DC converter 82 (the second voltage converter) coupled to the fuel cell stack 52 so as to be configured to receive the electric power supply from each of them. Accordingly, a load of the DC-DC converter 30 can be reduced, thereby ensuring a design with a decreased electric power capacity of the DC-DC converter 30.

The stop control of the fuel cell stack 52 includes a case where the fuel cell stack 52 is cooled while the fuel gas supply is minimized such that the fuel cell stack 52 generates electric power barely enough to drive the compressor 60 and the fuel cell auxiliary machine 80. Even in such a case, the electric power can be supplied to the fuel cell auxiliary machine 80 via the DC-DC converters 56 and 82, and also, the electric power can be supplied to the compressor 60 via the DC-DC converters 56 and 58, thereby ensuring a self-sustained operation of the fuel cell stack 52.

The fuel cell auxiliary machine 80 can receive the electric power supply also from the auxiliary machine battery 74, which supplies the electric power to the vehicular auxiliary machine 78. However, the auxiliary machine battery 74 is also coupled to the DC-DC converter 30 (the first voltage converter) and the DC-DC converter 82 (the second voltage converter) so as to be configured to receive the electric power supply from each of them. Accordingly, charging of the auxiliary machine battery 74 can be easily covered.

The control unit 84 performs the control to stop the driving of the fuel cell auxiliary machine 80 when the auxiliary machine battery 74 charged via the DC-DC converter 82 (the second voltage converter) in the stop control of the fuel cell stack 52 reaches the predetermined amount of charge. This ensures the amount of charge of the auxiliary machine battery 74 for operating the vehicular auxiliary machine 78 and the fuel cell auxiliary machine 80 with certainty in the next activation.

The control unit 84 performs the control to cut off the coupling line 50 to the switches 66A (the changeover switch) and 66B when the motor driving battery 14 is cut off from the electric power supply line 12. This avoids the electric charge carried by the DC-DC converter 56, the DC-DC converter 58, and the DC-DC converter 82 (the electric charge carried by the coupling line 50) from flowing into the motor driving inverter 24 (the drive motor 26), thereby ensuring avoiding the excessive current from damaging the discharge circuit 28 coupled to the motor driving inverter 24.

Even after the cutoff of the motor driving battery 14, the coupling from the fuel cell stack 52 to the DC-DC converter 82 and the coupling from the fuel cell stack 52 to the DC-DC converter 58 are maintained. Accordingly, even after the cutoff of the motor driving battery 14, the electric power can be supplied from the fuel cell stack 52 to the fuel cell auxiliary machine 80 and the compressor 60, and even if the electric power of the auxiliary machine battery 74 is depleted, the self-sustained operation of the fuel cell stack 52 is possible. Furthermore, when the fuel cell stack 52 not only supplies the electric power to the fuel cell auxiliary machine 80 and the compressor 60 but also generates the electric power barely enough to charge the auxiliary machine battery 74 during the stop control, the electric power for the fuel cell auxiliary machine 80 can be covered by the auxiliary machine battery 74, thereby ensuring covering the electric power required for the next stop process with certainty without relying on the compressor battery 62.

The control unit 84 performs the control to electrically conduct the charging circuit 68 when the motor driving battery 14 is coupled to the electric power supply line 12, and after the predetermined time, electrically conduct the switch 66A (the changeover switch). This avoids the inrush current to the coupling line 50, thereby ensuring preventing the damage to the components, such as the DC-DC converter 56 coupled to the coupling line 50 and the motor driving battery 14.

The embodiment of the present invention described above are merely illustration of a part of application examples of the present invention and not of the nature to limit the technical scope of the present invention to the specific constructions of the above embodiments.

This application claims priority based on Patent Application No. 2015-243837, filed with the Japan Patent Office on Dec. 15, 2015, the entire contents of which are incorporated herein by reference.

The invention claimed is:

1. A fuel cell system comprising:
    a fuel cell configured to supply an electric power to an electric power supply line connecting a driving motor and a motor driving battery;
    a fuel cell auxiliary machine used for driving the fuel cell;
    a first voltage converter branched from the electric power supply line and connecting to a low voltage line connected with the fuel cell auxiliary machine wherein the first voltage converter is configured to step down a first voltage of the electric power supply line and supply the stepped down first voltage to the low voltage line;
    a second voltage converter configured to connect the fuel cell and a coupling line branched from the electric power supply line wherein the second voltage converter is configured to step up an output voltage of the fuel cell and supply the stepped up output voltage to the coupling line; and
    a third voltage converter configured to connect the coupling line and the low voltage line wherein the third voltage converter is configured to step down a second voltage of the coupling line and supply the stepped down second voltage to the low voltage line.

2. The fuel cell system according to claim 1, further comprising:
    an auxiliary machine battery coupled to the first voltage converter, the auxiliary machine battery having a voltage lower than a voltage of the motor driving battery, wherein
    the fuel cell auxiliary machine and the second voltage converter are coupled to the auxiliary machine battery.

3. The fuel cell system according to claim 2, wherein
    the fuel cell system continues an electric generation of the fuel cell until the auxiliary machine battery reaches a predetermined amount of charge in a stop control of the fuel cell system.

4. The fuel cell system according to claim 1, wherein
    the fuel cell auxiliary machine is a fuel supply unit configured to supply a fuel to the fuel cell.

5. The fuel cell system according to claim 1, further comprising:
    a changeover switch configured to switch between a cutoff and an electrical conduction of the coupling line;
    a discharge circuit configured; and
    a control unit configured to control the changeover switch and the discharge circuit, wherein
    the second voltage converter is coupled to a fuel cell side of the coupling line with respect to the changeover switch in the coupling line, and
    the control unit is configured to
        control the changeover switch to cut off the coupling line when a control to cut off the motor driving battery from the electric power supply line is performed, and
        control the discharge circuit to step down a voltage of the electric power supply line.

* * * * *